United States Patent [19]

Heilmann

[11] 4,094,384
[45] June 13, 1978

[54] BAYONET CONNECTING SYSTEM FOR COLLECTOR BOWL ATTACHMENT TO CONNECTING HOUSING OF COMPRESSED AIR CONDITIONING DEVICE

[75] Inventor: Roland Heilmann, Neuenhaus, Germany

[73] Assignee: Firma Festo-Maschinenfabrik Gottlieb Stoll, Esslingen, Germany

[21] Appl. No.: 734,268

[22] Filed: Oct. 19, 1976

[30] Foreign Application Priority Data

Oct. 22, 1975  Germany ..................... 7533573[U]

[51] Int. Cl.² .............................................. F16N 7/32
[52] U.S. Cl. ................................ 184/55 A; 285/360; 403/349
[58] Field of Search ...................... 184/55 A, 55 R; 403/349, 350, 316 (U.S. only), 317; 285/360, DIG. 22, DIG. 7

[56] References Cited

U.S. PATENT DOCUMENTS

| 948,437 | 2/1910 | Wilson et al. ................ 285/360 X |
| 1,195,433 | 8/1916 | Bailey ........................... 285/360 X |
| 2,241,773 | 5/1941 | Ernolf .......................... 285/360 X |
| 2,561,279 | 7/1951 | Holt .............................. 403/349 X |
| 2,643,581 | 6/1953 | Wehrenfennig ............. 403/349 X |
| 3,182,750 | 5/1965 | Gleason et al. ............. 184/55 A X |
| 3,214,054 | 10/1965 | Poethig et al. ............. 184/55 A X |
| 3,384,103 | 5/1968 | Lansky ......................... 184/55 A X |
| 3,572,469 | 3/1971 | Miller et al. ................. 184/55 A |
| 3,696,889 | 10/1972 | Brake ............................ 184/55 A |

*Primary Examiner*—David H. Brown
*Attorney, Agent, or Firm*—Watson, Cole, Grindle & Watson

[57] ABSTRACT

A system for connecting and locking a collector bowl to a connecting housing attached to an air conditioning device. The collector bowl, near its open end, is provided with radially outwardly extending multiple counter-lugs, and the connecting housing, near its open end, is provided with inwardly extending multiple lugs. When the open end of the collector bowl is fitted within the open end of the connecting housing, the counter-lugs are moved past the lugs due to the (discontinuity) areas therebetween and the collector bowl is twisted to produce a connecting engagement between the lugs and the counter-lugs. Snap projections on the collector bowl or spring-load latching parts on the connecting housing, appropriately located, can function to lock the collector bowl to the connecting housing by preventing disengagement of the lugs and counter lugs.

13 Claims, 15 Drawing Figures

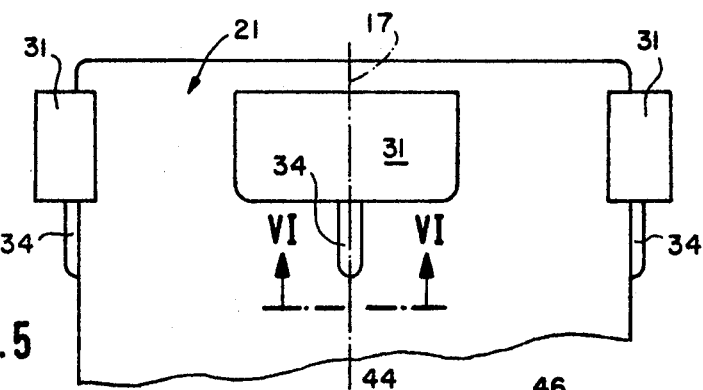
FIG. 5
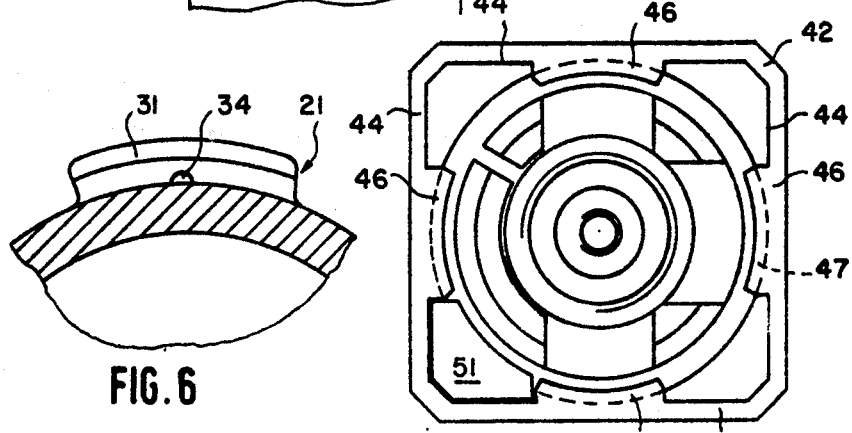
FIG. 6
FIG. 9
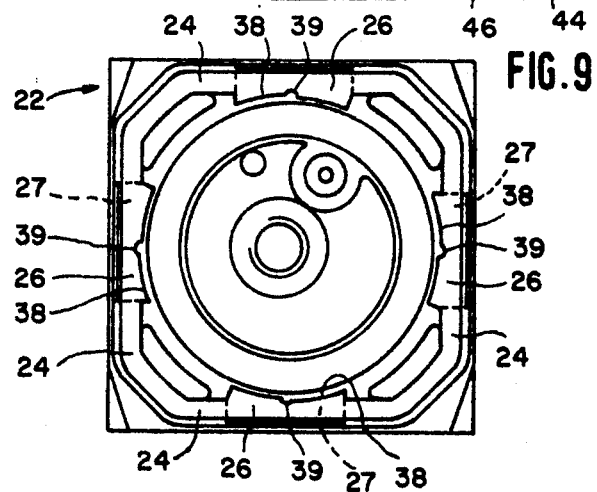
FIG. 7

BAYONET CONNECTING SYSTEM FOR COLLECTOR BOWL ATTACHMENT TO CONNECTING HOUSING OF COMPRESSED AIR CONDITIONING DEVICE

BACKGROUND OF THE INVENTION

1. Field of the Invention

The present invention relates to a compressed air conditioning device comprising an oil atomizer, a pressure regulator, a separator and the like which can be used in a compressed air conditioning apparatus, the device including a connecting housing, and a collector bowl which can be locked in position on the connecting housing by means of a lockable bayonet union for which purpose the collector bowl has a shoulder and the connecting housing has lugs.

2. Description of the Prior Art

In known devices of this type, the shoulder on the collector bowl is continuous. The bayonet union is formed partially by the housing and partially by an additional ring which is pushed over the collector bowl holding this firmly over the shoulder after fastening and incorporating a locking device so that the union cannot loosen unintentionally. Attachment and removal of the bowl are relatively complicated operations because of the ring, the ring being an additional component which must be of a bulky shape for reasons of strength, and owing to the handling it is elaborate and expensive to manufacture.

The object of the present invention is to produce a compressed air conditioning device in which the collector bowl can be mounted and removed quickly and reliably without additional aids being necessary.

SUMMARY OF THE INVENTION

According to the present invention, this object is solved by providing the shoulder of the collector bowl with discontinuities and counter-lugs whereby after introducing the collector bowl into the connecting housing and turning the collector bowl, the counter-lugs formed by the shoulder on the collector bowl engages behind the lugs provided on the connecting housing in an axial direction. Also according to the present invention, there is provided a safety device tht latches automatically on the collector bowl when the collector bowl is turned in the direction of closure and prevents the collector bowl from becoming loose.

In this way, an additional ring for the bayonet union is not required since the parts which exist anyway, i.e. the connecting housing and the collector bowl, are designed such that they provide the complete union themselves. This results not only in considerable simplification in manufacture, but also in handling. Loose parts cannot get lost. The two parts are connected securely by a simple insertion and rotary movement. The collector bowl cannot loosen even as a result of vibrations which occur frequently with compressed air supply.

The present invention will now be described with reference to the forms of construction shown in the drawings.

DESCRIPTION OF THE DRAWINGS

FIG. 5 shows a partial side view of the collector bowl of another embodiment of the present invention to a larger scale;

FIG. 6 shows a partial section of the collector bowl at line VI—VI in FIG. 5;

FIG. 7 shows a view from below of the connecting housing of the embodiment corresponding to the collector bowl in FIGS. 5 and 6, viewed in the direction of arrow VII in FIG. 1;

FIG. 9 shows a view from below of the connecting housing of the device corresponding to FIG. 8 with collector bowl removed;

DETAILED DESCRIPTION OF THE PREFERRED EMBODIMENTS

Figure 1:
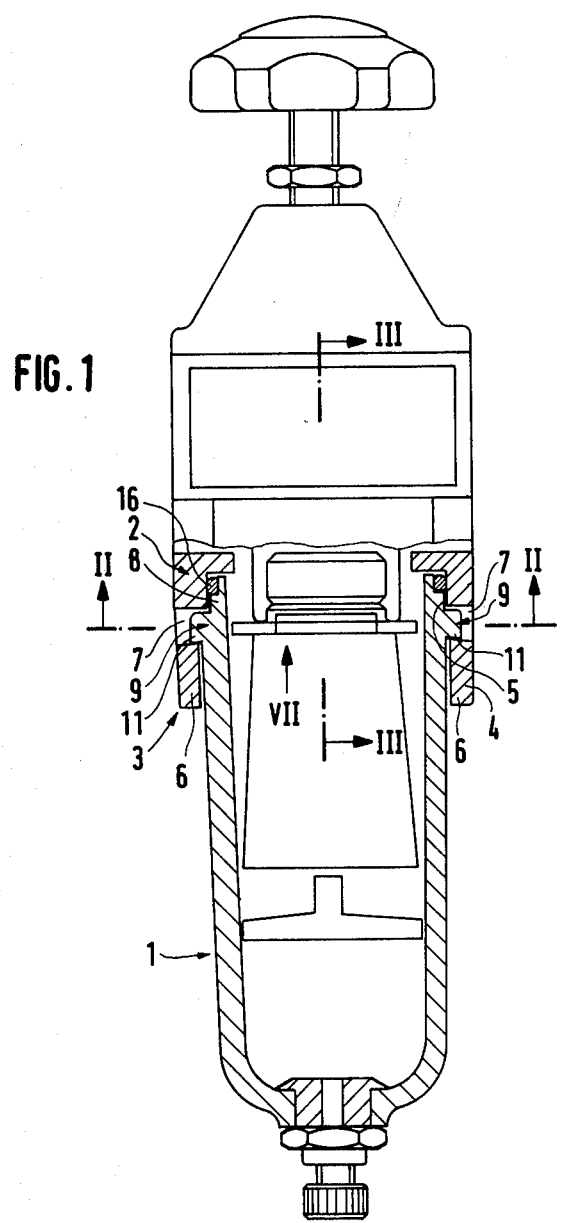
FIG. 1 shows a longitudinal section through a first embodiment of a compressed air conditioning device in accordance with the present invention and in the form of a filter pressure reducer, partially as a side view.

The filter pressure reducer shown in FIG. 1 has a collector bowl 1 which as a rule is made of transparent plastic and joined in a detachable manner to a connecting housing 2 by means of a bayonet union 3. The connecting housing 2 is shaped roughly as a cube, the lower part of which is hollow. Viewed in cross section, the connecting housing is therefore square. From the internal side 5 of the housing walls 4 which protrude in an axial direction, a lug 6 projects from the middle of each housing wall 4, and above each lug 6 there is a break-through 7, i.e. a break-through 7 is adjacent to each lug 6 in an axial direction, these break-throughs 7 being arranged in one level.

At a distance from the open edge 8, the collector bowl 1 has a shoulder 9 with discontinuities 10 thus forming counter-lugs 11 which can be inserted into the break-through 7.

Figure 2:
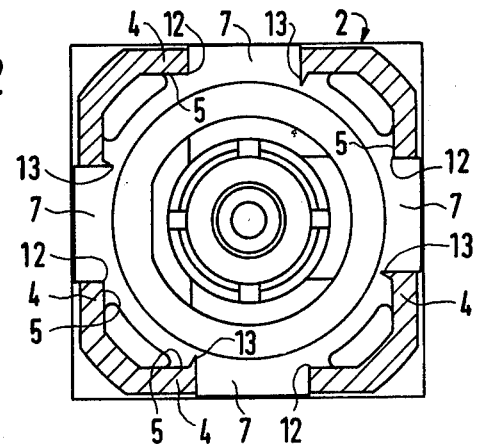
FIG. 2 is shows a cross section through the connecting housing at line II—II in FIG. 1.
Figure 3:
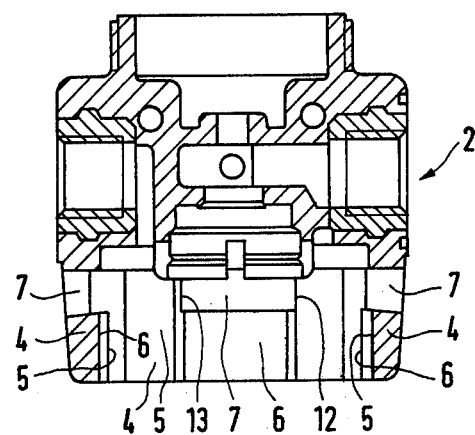
FIG. 3 shows a section through the connecting housing at line III—III in FIG. 1.
Figure 4:
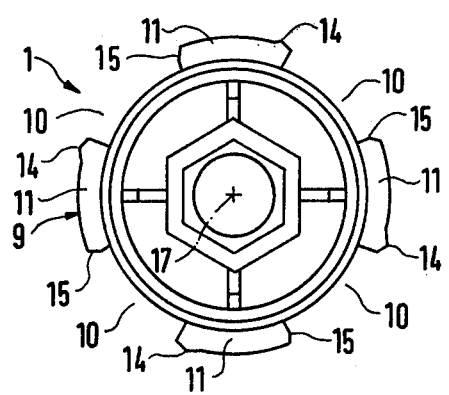
FIG. 4 shows the plan view of the collector bowl of the device shown in FIG. 1.
Figure 8:
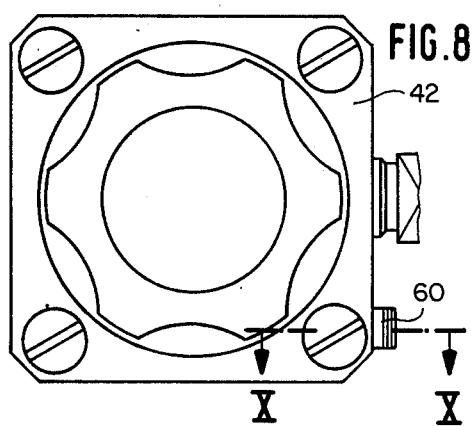
FIG. 8 shows the plan view of another embodiment of the present invention similar to the device shown in FIG. 1.
Figure 10:
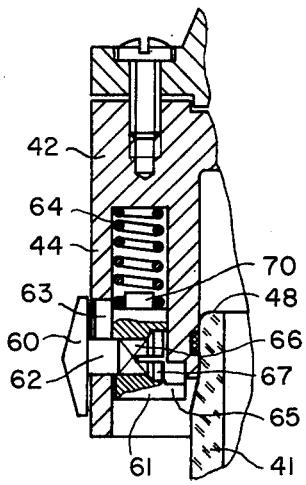
FIG. 10 shows a partial section at line X—X in FIG. 8.
Figure 11:
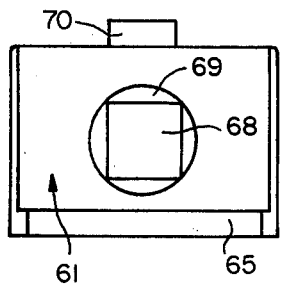
FIG. 11 shows a view of a detail of the device shown in FIGS. 8 to 10 from the front.
Figure 12:
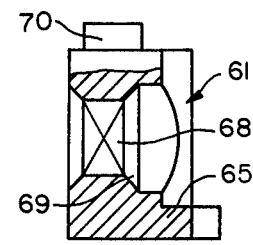
FIG. 12 shows the detail shown in FIG. 11 from the side, partially in section.
Figure 13:
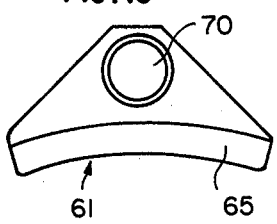
FIG. 13 shows a plan view of the detail shown i n FIGS. 11 and 12.
Figure 14:
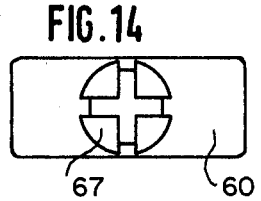
FIG. 14 shows a view of an operating knob with a connecting element of the device shown in FIGS. 8 to 13 from below.
Figure 15:
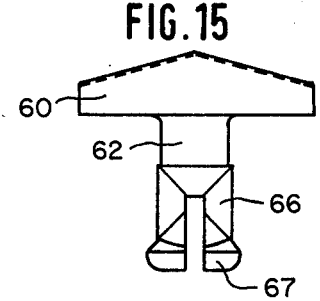
FIG. 15 an additional view from the side.

On one of the two opposite internal surfaces viewed in a peripheral direction; the break-throughs 7 have an edge 12, and on the other internal surface a projection protruding inwards which acts as stop 13 by means of which continued rotation of the counter-lug 11 is prevented when turning the collector bowl 1 in the direction of closure. The peripheral dimensions of the counter-lugs 11 are only slightly smaller than the widths of the break-throughs 7. A snap projection 14 is provided on the external diameter of each counter-lug 11. The distance of these snap projections 14 from the center of rotation of the collector bowl 1 is somewhat greater than the distance of the edges 12, and thus when the collector bowl 1 is turned in the connecting housing 2 these snap projections 14 snap over the edges 12 and engage behind these in a radial direction thus preventing unintentional loosening of the collector bowl 1. The stops 13 on the collector bowl 1 are arranged such that they are opposite the snap projections 14, and when turning the collector bowl the front lug surfaces 15 on the counter-lugs 11 bear against the stops 13 when the snap projections 14 have snapped in position over the edges 12. As can be seen from FIG. 2, the internal sides 5 of the connecting housing 2 bulge out of the extent that the collector bowl 1 with the protruding counter-lugs 11 can be pushed into the connecting housing 2 from below until the edge 8 bears against the connecting housing 2 on the inside with its sealing ring 16 which provides the seal between the collector bowl 1 and the internal wall 5. By turning, the counter-lugs 11 then engage in an axial direction behind the lugs 6 on the connecting housing 2 and prevent the collector bowl 1 from falling off.

To ensure reliable snapping of the snap projections 14 over the edges 12, collector bowl 1 is made of an elastic transparent plastic and thus the snap projections 14 snap with elastic resilience over the edges 12 without overelongation of the material or permanent deformation. In addition, the connecting housing 2 can also be made of an elastic plastic, making double elastic resilience possible.

In another design of the safety device that latches automatically on the collector bowl when the collector bowl is turned in the direction of closure and preventing it from becoming loose, shown in FIGS. 5 to 7, the snap projections 34 are arranged below the counter-lugs 31 and project from the surface of the collector bowl 21. In cross section, these snap projections 34 have roughly a semi-circular cylindrical surface. The axis (which is not shown) is parallel to the axis of rotation 17 of the collector bowl 21. The length of the snap projections 34 corresponds roughly to the lugs 26 on the connecting housing 22.

FIG. 7 represents a view from below of a connecting housing 22 for the design of collector bowl shown in FIGS. 5 and 6. In order to be able to insert the snap projections 34 over the surfaces of the lugs 26, these are each provided with an entering surface 38 on one side for the snap projection 34 an run into a notch 39 which matches the snap projections 34. The snap projections 34 and the side of the notch 39 facing away from the entering surface 38 serve at the same time as a stop against turning the collector bowl 21 too far in the connecting housing 22, and thus it is possible to quickly insert the collector bowl 21 in the connecting housing 22 without the safety device no longer being in its latching position as a result of turning too far. Thus, when the lugs 26 of the connecting housing 22 engage behind the counter-lugs 31 on the collector bowl 21, the snap projections 34 have latched into the notches 39.

The longitudinal section of the embodiment shown in FIGS. 8 to 15 is similar to the longitudinal section shown in FIG. 1 and hence a separate description has not been given. The break-throughs 47 are, however, closed towards the outside and arranged above the lugs 46 they constitute partial annular grooves into which the counter-lugs 51, the width of which measured in an axial direction corresponds to the width of the partial annular grooves, engage when the collector bowl 41 is inserted. Furthermore, in this embodiment the collector bowl corresponds essentially to the collector bowl shown in FIGS. 5 and 6 but without the snap projections 34. In plan view, apart from a number of insert gaps, the lugs 6 and the counter-lugs 11 form a closed circle when inserting.

On the external side of the connecting housing 2, there is an operating knob 20 which is connected to an internally located latching part 21 through connecting element 22. The connecting element 22 protrudes through a slot 23 in the housing wall 4. The latching part 21 can be moved in the connecting housing 2 parallel to the axis of the collector bowl 1 against the action of a spring 24. As portrayed in FIGS. 11 to 13 in particular, the latching part 21 constitutes a three-sided prism which fills one corner (FIG. 9) between two lugs 6. The latching part 21 is held by the spring 24 in the end position in which there is an extension 25 at the level of the partial annular grooves.

The operating knob 20 is made as one piece together with the connecting element 22. In the direction towards its free end, the connecting element 22 is provided with a square section 26 to which back snapping lugs 27 are joined. The square section 26 fits positively in an break-through 28 of the latching part 21. The back snapping lugs 67 engage behind a cone 69 in the latching part 61 thus providing a firm connection, whereby the connecting element 62 determines the end positions of the latching part 61 by its stop on the walls of the slot 63. The latching part 61 has an extension 70 for centering the spring 64.

To join the collector bowl 41 and the connecting housing 42, the bowl is inserted into the housing 42 such that the lugs 46 are located over the discontinuities 50 of the shoulder 49. When inserting, the latching part 61 is pushed back by one of the counter-lugs 51 against the action of the spring 64, and the seal 56 is effective. After inserting axially, the collector bowl 41 is turned with respect to the connecting housing 42 and the counter-lugs 51 engage behind the lugs 46. As soon as one counter-lug 51 leaves the area of the latching part 61, it is pushed downwards into its normal end position (FIG. 10) by the spring 64 and thus it is not possible to turn the collector bowl 41 any further because the face sides of the counter-lugs 51 strike against the extension 65 of the latching part 61. To release the collector bowl 41, the operating knob 60 is pushed upwards by hand against the action of the spring 64 such that the extension 65 is taken out of the path of rotation of the counter-lug 51. After turning the bowl 41 with respect to the connecting housing 42, it can be removed in an axial direction when the lugs 46 are in the area of the discontinuities 50.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A device such as an oil atomizer, a pressure regulator, or a separator, which can be used in a compressed air conditioning apparatus, which device includes a connecting housing having an open end and a separate collector bowl having an open end, said collector bowl being lockable together with said connecting housing, said collector bowl having near its open end thereof multiple external shoulder means extending peripherally outwardly therefrom to form multiple counter-lugs, said connecting housing having internal means forming inwardly extending open areas to form multiple lugs at its open end thereof with discontinuity areas therebetween, such that the multiple counter-lugs fit through the discontinuity areas when said open end of said collector bowl is fitted within said open end of said connecting housing, and when said collector bowl is turned the multiple counter-lugs will engage behind the multiple lugs to connect said collector bowl to said connecting housing; both said collector bowl and said connecting housing having interengageable means for locking said collector bowl to said connecting housing when said collector bowl is turned so that said multiple counter-lugs fully engage said multiple lugs.

2. The device of claim 1, wherein said locking means comprises a protruding snap projection on the periphery of at least one of the counter-lugs on said collector bowl, and wherein said connecting housing has an edge such that when said collector bowl is fitted within the open end of said connecting housing and turned, the snap projection engages the edge on said connecting housing and causes locking therebetween.

3. The device of claim 1, wherein the multiple lugs on said connecting housing are each formed by a projection protruding radially inwardly from a housing wall, each projection being adjacent, in an axial direction, to a break-through area in said connecting housing such that the multiple counter-lugs of said collector bowl are located in the break-through areas when said collector bowl has been turned to connect said collector bowl to said connecting housing.

4. The device of claim 1, wherein said locking means comprises a protruding snap projection on the periphery of said collector bowl beneath at least one of the multiple counter-lugs, such that the turning of said collector bowl causes the snap projection to engage with a notch formed by notch-forming means on said connecting housing.

5. The device of claim 4, wherein said lugs on said connecting housing are formed so as to provide a entering surface for the snap projection and so as to provide a notch at about the middle thereof.

6. The device of claim 1, wherein at least one stop means is attached to said connecting housing which projects radially inwardly to limit rotary movement of said collector bowl when said collector bowl is fitted in the open end of said connecting housing and turned, by contacting the leading edge of at least one counter-lug of the collector bowl.

7. The device of claim 6, wherein said collector bowl is elastically resilient in the area adjacent the shoulder means forming the multiple counter lugs and adjacent the open end thereof.

8. The device of claim 7, wherein said connecting housing is elastically resilient in the area adjacent the multiple lugs and adjacent the open end thereof.

9. The device of claim 1, wherein said locking means includes an operating knob on said connecting housing which is attached to a latching part which can be positioned to lock at least one of the multiple counter-lugs of said collector bowl in engagement with the adjacent lug of said connecting housing after said collector bowl has been connected to said connecting housing.

10. The device of claim 9, wherein the latching part is located within a discontinuity area of said collector bowl when in locking position.

11. The device of claim 9, wherein the latching part is a slide means which can be moved parallel to the axis of said connecting means and wherein a spring is connected to said connecting means to bias same towards the open end of the connecting means.

12. The device of claim 9, wherein said connecting housing has walls forming a generally rectangular cross-section, wherein the multiple lugs are located in about the center of the opposed walls, and wherein the latching part comprises a means which can occupy a corner between two adjacent lugs.

13. The device of claim 12, wherein the latching part has an opening therein through which a connecting element which is connected to the operating knob fitted.

* * * * *